June 18, 1957 W. L. STEUERWALD 2,795,920

ADJUSTABLE HARVESTER REEL MOUNTING

Filed Oct. 1, 1956

INVENTOR.
W. L. STEUERWALD

2,795,920

ADJUSTABLE HARVESTER REEL MOUNTING

Wilfred L. Steuerwald, Geneseo, Ill., assignor to Deere & Company, Moline, Ill., a corporation of Illinois Application October 1, 1956, Serial No. 613,304

10 Claims. (Cl. 56—221)

This invention relates to an adjustable mounting for harvester reels and the like and has for a principal object the provision of a novel and improved mounting of simple and compact design by means of which fore-and-aft adjustment of a harvester reel may be accomplished relative to a harvester platform.

In a typical harvester, a rotatable reel is normally disposed over the platform for cooperation with the cutting mechanism. The operational characteristics of the reel vary according to the type of crop, the height of the platform and other factors. Therefore, it is necessary and desirable that some provision be made for adjusting the reel fore-and-aft relative to the cutting mechanism. According to the present invention, the reel is mounted on the platform by mounting means respectively at its opposite ends, this mounting means including a pair of fore-and-aft supports, one at each end of the reel, each support including a carrier movable lengthwise of the support and reel-mounting means connected to the carrier and selectively engageable with and disengageable from the support according to bodily movement of the reel. The invention features a novel arm mounting by means of which weight applied from the reel to the arm serves to automatically lock the reel mounting means against fore-and-aft movement, the means being releasable upon lifting of the reel so that the reel-mounting arm or member is releasable from the support, whereby the support, member and reel may be moved bodily lengthwise of the support to a new position. It is an object of the invention to provide a simple mounting in the form of an inverted U-shaped carrier embracing a longitudinal support and providing opposite legs between which the reel-mounting arm may be mounted, one end of the arm supporting the reel and the other end of the arm having means thereon selectively engageable with and disengageable from the underside of the support. A further feature of the invention resides in means for locking the reel-mounting arm against accidental disengagement from the support.

The foregoing and other important objects and desirable features inherent in and encompassed by the invention will become apparent as a preferred embodiment thereof is disclosed by way of example in the ensuing specification and accompanying sheet of drawings, the several figures of which are described immediately below.

Figure 1:
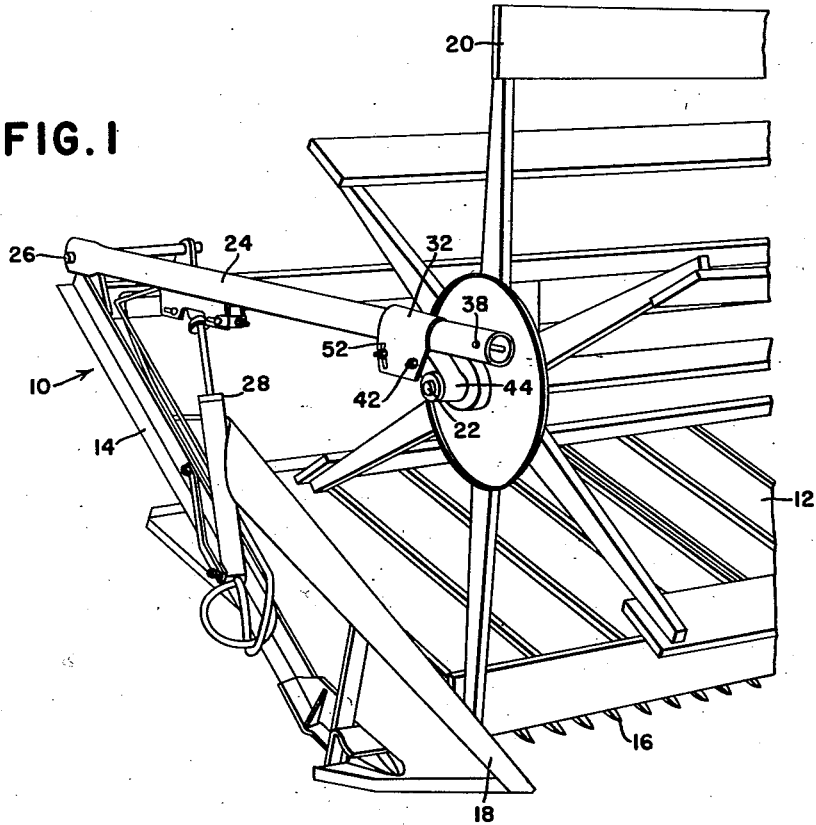
Fig. 1 is a fragmentary perspective of one end portion of a typical harvester, illustrating the relationship between the reel and the platform and the means for adjustably mounting the reel.

The portion of the harvester chosen for purposes of illustration is based on a harvester of the windrower type; although, the specific type of harvester is not material, nor does it limit the invention. For present purposes, the harvester may be considered as including a basic frame structure 10 including a platform 12 disposed transverse to the line of travel of the machine, as is conventional. Although only one end of the machine is shown, it will be understood that the structure is duplicated at the opposite end.

With the above in mind, it will be understood that the platform is delineated at opposite ends by fore-and-aft extending frame members, only one of which is visible at 14. The platform has across its forward edge typical cutting mechanism, a portion of which is here visible at 16. The frame member 14 is augmented by a fore-and-aft grain divider 18.

A conventional rotatable reel 20 is disposed over the platform 12 and has an elongated central reel shaft 22 by means of which the reel is rotatably supported.

According to the present invention, support of the reel is accomplished by a fore-and-aft support 24, of elongated construction having its length normal to the axis of the reel shaft 22. The support is pivotally connected at its rear end at 26 to the frame structure 10 and is therefore capable of vertical adjustment. Again, it should be recalled that a similar support (not shown) appears in a typical machine at the opposite end of the platform. Vertical adjustment of the support 24 is accomplished by means shown here as a hydraulic cylinder and piston assembly 28, which details are unimportant but which are described merely because they are illustrated as part of the component background of the structure. As is well known, vertical adjustment of the support 24, or of a support similar thereto, varies the vertical position of the reel relative to the cutting mechanism 16 at the forward end of the platform 12.

The support 24 is here illustrated as a pipe or tube having its underside provided with a plurality of apertures 30 which serve as lock elements, as will soon appear. The support has mounted thereon a carrier 32, which is here in the form of an inverted U having its bight 34 resting slidably on top of the support 24 and further having opposite depending legs 36 projecting at opposite sides of the support. From the description thus far, it will be seen that the support 32 is capable of movement lengthwise or fore-and-aft of the support 24. A forward portion of the support has a stop pin 38 therein to prevent inadvertent forward displacement of the carrier.

Figure 3:
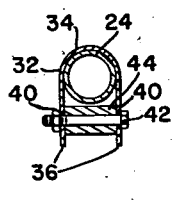
Fig. 3 is a transverse section as seen along the line 3—3 of Fig. 2.
Figure 2:
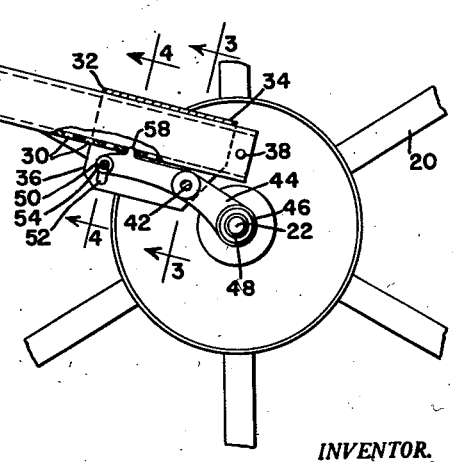
Fig. 2 is an enlarged fragmentary view, partly in section, showing the details of the mounting means.
Figure 4:
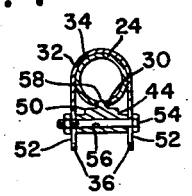
Fig. 4 is a transverse section as seen along the line 4—4 of Fig. 2.

A forward portion of the carrier includes a pair of alined apertures 40 respectively in the depending legs 36 (Fig. 3). These apertures receive a transverse pivot 42 for effecting the mounting of a reel-mounting arm or member 44. As will be seen, the pivot axis provided by the pivot member 42 is parallel to the axis of the reel shaft 22. This pivot mounts the arm or member 44 intermediate its ends, so that the arm has a first or forward end 46 provided with a journal or equivalent means 48 for receiving the proximate end of the reel shaft 22. The arm further has a second or rearward end 60 disposed beneath the support 24 and between the legs 36 of the carrier. At this point, each of the legs 36 has an arcuate slot 52 formed about the pivot 42 as a center, the slots being transversely alined and adapted to receive means in the form of a bolt or equivalent fastening device 54, which device is passed through an appropriate aperture 56 in the rear end 50 of the arm 44 (Fig. 4).

The rear end portion of the arm or member 44 has thereon a lug 58 which is selectively cooperative with any one of the lock elements established by the previously described apertures 30 in the underside of the pipe or support 24.

Operation

The pivotal mounting of the arm 44 at 42 on the carrier 32 via the carrier legs 36 enables rocking of the arm 44 according to whether or not reel weight is applied to the front or first end 46 of the arm. During normal operation, the weight of the reel will naturally impose itself on the forward end of the arm, which will necessarily incur upward movement of the rear end 50 of the arm. Alinement of the lug 58 on the arm with a selected one of the apertures 30 in the pipe 24 will serve to prevent fore-and-aft movement of the carrier, arm and reel bodily relative to the support. As an adjunct to the securing of the selected position of the structure just described, the fastening device or bolt 54 may be tightened to establish a frictional lock across the legs 36 of the carrier.

When it is desired to adjust the reel fore-and-aft on the support 24 (and on its companion support at the other end of the machine) the bolt 54 is loosened and the reel is lifted, causing disengagement of the lug 58 from its aperture 30, whereupon the carrier, arm and reel may be shifted bodily lengthwise of the support until a new position is obtained. Thereupon, the reel may be allowed to descend by its own weight and the lug 58 will enter a new aperture 30.

As will be seen, the invention features the normal engagement of the lug 58 with an aperture 30 by reel weight imposed on the arm 44, so that during normal operation the selected position is automatically incurred and maintained. Fore-and-aft adjustment of the reel is readily accomplished in the manner previously described, simply by releasing the device 54 and lifting the reel so that the lug 58 may be disengaged from its aperture 30. The magnitude of the fore-and-aft adjustment available will be determined by the number of apertures 30 provided in the pipe.

Features of the invention not categorically enumerated will readily occur to those versed in the art, as will variations in the preferred structure illustrated, all of which may be achieved without departure from the spirit and scope of the invention.

What is claimed is:

1. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support; a mounting arm pivoted to the carrier intermediate its ends on an axis parallel to the reel shaft and having a first end including means receiving the reel shaft and further having a second end including support-engaging means; and said support-engaging means being operative to establish a locking relationship with the support when reel weight is imposed on the first end of the arm so as to lock the carrier against movement lengthwise of the support, said support-engaging means being releasable from the support when the reel and said first end of the arm are bodily lifted.

2. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support; a mounting arm pivoted intermediate its ends to the carrier and having a first end including means receiving the reel shaft and further having a second end including support-engaging means; and said support-engaging means being operative to establish a locking relationship with the support when the reel and the first end of the arm are moved bodily in one direction so as to lock the carrier against movement lengthwise of the support, said support-engaging means being releasable from the support when the reel and said first end of the arm are moved bodily in the opposite direction.

3. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support; a mounting arm pivoted to the carrier for movement selectively in opposite directions, said arm having a first portion supportingly receiving the reel shaft and a second portion selectively engageable with and disengageable from the support according to the direction of movement of the arm; and said arm and reel being arranged so that normal transfer of the weight of the reel to the arm causes engagement of said second arm portion with the support to thereby hold the carrier against movement lengthwise of the support and so that relieving reel weight from said arm incurs disengagement of said second arm portion from the support to enable lengthwise adjusting movement of the carrier, arm and reel.

4. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support; a mounting member carried by and movable relative to the carrier selectively in opposite directions, said member having a first portion supportingly receiving the reel shaft and a second portion selectively engageably with and disengageable from the support according to the direction of movement of the member; and said member and reel being arranged so that normal transfer of the weight of the reel to the member causes engagement of said second member portion with the support to thereby hold the carrier against movement lengthwise of the support and so that relieving reel weight from said member incurs disengagement of said second member portion from the support to enable lengthwise adjusting movement of the carrier member and reel.

5. In a harvester having frame structure including a harvesting platform and a rotatable reel disposed over the platform and including a mounting shaft; the improvement residing in means supporting the reel on the frame structure, comprising: an elongated support carried by the frame structure and having its length normal to the reel shaft; a carrier mounted on and movable lengthwise of the support; a mounting member carried by and movable relative to the carrier selectively in opposite directions, said member having a first portion supportingly receiving the reel shaft and a second portion selectively engageable with and disengageable from the support according to the direction of movement of the member; and said member and reel being arranged so that bodily movement of the reel and member in one direction causes engagement of said second member portion with the support to thereby hold the carrier against movement lengthwise of the support and so that bodily movement of the reel and member in the opposite direction incurs disengagement of said second member portion from the support to enable lengthwise adjusting movement of the carrier, member and reel.

6. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support, said carrier being in the form of an inverted U, having a bight portion resting on the support and a pair of legs depending at opposite sides of the support; an arm disposed between the legs of the carrier and pivoted intermediate its ends to said legs on an axis parallel to the reel shaft, said arm having a first end including means supportingly receiving the reel shaft and a second end beneath the support and movable upwardly when reel weight is applied to the first end of the arm and movable downwardly when the reel and the first end of the arm are lifted; and means on the second end of the arm and engageable with and disengageable from the support respectively upon upward and downward movement of said second end of the arm so as to respectively prevent and enable bodily positioning of the carrier, arm and reel lengthwise of the support.

7. The invention defined in claim 6, in which: the legs of the carrier are respectively provided with slots arcuate about the arm-to-carrier pivot and in substantial register with the second end of the arm; and said second end of the arm includes means extended through and capable of following said slots during movement of the arm.

8. The invention defined in claim 7, in which: said last named means includes a releasable fastening device operative to releasably secure the arm at its second end to the carrier.

9. The invention defined in claim 6, in which: the underside of the support includes lock elements spaced lengthwise of said support; and the support-engaging means on the second end of the arm includes a lock element selectively cooperative with certain of the first-mentioned lock elements according to bodily positioning of the carrier, arm and reel along the support.

10. In a harvester having frame structure including a harvesting platform and a rotatable reel disposed over the platform and including a mounting shaft, the improvement residing in means supporting the reel on the frame structure, comprising: an elongated support carried by the frame structure and having its length normal to the reel shaft; a carrier mounted on and movable lengthwise of the support, said carrier being in the form of a U, having a bight portion slidably engaging the support and a pair of legs projecting vertically at opposite sides of the support; a mounting member disposed between the legs of the carrier and pivoted to said legs on an axis parallel to the reel shaft, said member having a first portion including means supportingly receiving the reel shaft and a second portion juxtaposed relative to the support and movable toward the support when reel weight is applied to the first end of the member and movable away from the support when the reel and the first end of the member are lifted; and means on the second end of the member and engageable with and disengageable from the support respfectively according to whether reel weight is applied to the member or the reel and member are lifted so as to respectively prevent and enable bodily positioning of the carrier, member and reel lengthwise of the support.

No references cited.